United States Patent [19]
Ishii

[11] Patent Number: 6,044,421
[45] Date of Patent: Mar. 28, 2000

[54] COMMUNICATION SYSTEM USING A TRANSMITTED DELIMITING SIGNAL FOR INDICATING BREAKS IN A DATA SIGNAL AND WHEN CONSECUTIVE BITS IN THE DATA SIGNAL ARE OF EQUAL LEVEL

[75] Inventor: Yasushi Ishii, Tenri, Japan

[73] Assignee: Sharp Kabushiki Kaisha, Osaka, Japan

[21] Appl. No.: 09/070,773

[22] Filed: May 1, 1998

[30] Foreign Application Priority Data

May 19, 1997 [JP] Japan ................................. P9-128961

[51] Int. Cl.[7] ....................................... G06F 13/14
[52] U.S. Cl. ............................ 710/61; 709/248; 709/233; 375/359; 375/360; 375/288; 713/400; 713/600
[58] Field of Search .............................. 710/65, 61, 126; 709/233, 248; 375/288, 289, 360; 713/400, 600

[56] References Cited

U.S. PATENT DOCUMENTS

| | | | |
|---|---|---|---|
| 4,092,492 | 5/1978 | Eachus | 178/68 |
| 4,592,072 | 5/1986 | Stewart | 375/55 |
| 5,438,571 | 8/1995 | Albecht et al. | 370/94.3 |
| 5,504,929 | 4/1996 | Blair et al. | 710/65 |
| 5,671,258 | 9/1997 | Burns et al. | 375/359 |
| 5,726,650 | 3/1998 | Yeoh et al. | 341/70 |
| 5,748,902 | 5/1998 | Dalton et al. | 709/246 |
| 5,905,759 | 5/1999 | Ishida et al. | 375/282 |

FOREIGN PATENT DOCUMENTS 8-163182  6/1996  Japan.

*Primary Examiner*—Thomas C. Lee
*Assistant Examiner*—Jibreel Speight
*Attorney, Agent, or Firm*—Nixon & Vanderhye, P.C.

[57] ABSTRACT

A transmitting device and a receiving device are interconnected through two transmission paths, i.e. a data signal line for transmitting serial data, and a delimiting signal line for transmitting a delimiting signal. The delimiting signal causes the receiving device to recognize breaks between bits when the consecutive bits of the transmitted serial data have the same value. The level of the delimiting signal remains unchanged in the event of a change in the logical value of consecutive bits of the transmit data. The level of the delimiting signal is changed when consecutive bits of the transmit data have the same value. The receiving end, receiving the data signal and delimiting signal, reads as digital data the logical value of each bit in the data signal by regarding a point of time of a level change in either one of the data signal and delimiting signal as a break between bits.

5 Claims, 5 Drawing Sheets

COMMUNICATION SYSTEM USING A TRANSMITTED DELIMITING SIGNAL FOR INDICATING BREAKS IN A DATA SIGNAL AND WHEN CONSECUTIVE BITS IN THE DATA SIGNAL ARE OF EQUAL LEVEL

BACKGROUND OF THE INVENTION

1. Field of the Invention

The present invention relates to methods and apparatus for communicating digital data as serial data in time series representing logical values of respective bits of the digital data.

2. Description of the Related Art

Clock-synchronized communication has been well-known heretofore as a method of transmitting and receiving serial data expanded to a time series from digital data. In clock-synchronized communication, the transmitting end transmits, through separate transmission paths, a clock signal indicating breaks between respective bits, and a data signal synchronized with the clock signal, while the receiving end takes in the data signal at points of time synchronized with the incoming clock signal.

Clock-synchronized communication has no limitation to transmission speed insofar as the receiving device is capable of receiving the transmit signals. It is also possible to vary transmission speed in the course of signal transmission only if the data signal remains synchronized with the transmission clock signal. Clock-synchronized communication, little restricted in terms of transmission speed as noted above, is realized with software and widely used in systems employing one-chip microcomputers and the like having general-purpose input/output (I/O) ports.

FIG. 5A shows one example of conventional systems designed for clock-synchronized communication. In clock-synchronized communication, I/O interfaces of a transmitting device 1 and a receiving device 2 are interconnected by a data signal line 3 seerving as a transmission path of data signals, and a clock signal line 4 serving as a transmission path of clock signals.

FIG. 5B shows an example of transmit data and examples of data signals and clock signals used in a conventional method of clock-synchronized communication. In FIG. 5B, logical value "1" is applied to the high voltage level of the signals, and logical value "0" to the low voltage level.

The transmitting device 1 varies or holds a logical value of the data signal in synchronism with a change from high level to low level (also called "fall" hereinafter) of the clock signal, and maintains the value of the data signal until a next fall of the clock signal. Subsequently, upon a lapse of a predetermined time, the clock signal changes from low level to high level (which change is also called "rise" hereinafter). The above sequence is repeated after a further predetermined time, which is continued until completion of the data transmission.

The receiving device 2 constantly reads the values of the clock signals transmitted through the clock signal line 4. The receiving device 2 takes in the values of the data signal at rises of the clock signals, which is continued until completion of the data reception.

There is also a method opposite to the example shown in FIG. 5B. In this method, the transmitting device successively transmits bit data in synchronism with rises of the transmission clock signals, while the receiving device takes in the data at falls of the clock signals.

FIG. 6 shows a method of serial communication disclosed in JP-A 8-163182(1996). This method employs two signal forms, i.e. form 1 and form 2, corresponding to each of sign "0" and sign "1" used in communication. Form 1 and form 2 of sign "0" take the high signal level and the low signal level, respectively. Form 1 and form 2 of sign "1" alternately take the high signal level and the low signal level. A high-level period of form 1 for sign "0", a low-level period of form 2 for sign "0", a sum of one high-level period and one low-level period of form 1 for sign "1" and a sum of one low-level period and one high-level period of form 2 for sign "1" are all controlled to equal a minimum unit communication time provided by the system. This method of serial communication facilitates a bit-by-bit synchronization since a clock signal is superposed on a data signal.

To transmit 1-bit data in the conventional clock-synchronized communication, the data signal needs to be changed only once, but the clock signal must be changed from high level to low level and, after the predetermined time, from low level to high level. That is, a communication of 1-bit data requires the clock signal to be changed twice.

On the other hand, the receiving end, constantly reading the values of the clock signals during reception, must confirm a change of the clock signal from high level to low level, and then read a change of the clock signal to high level. That is, two changes of the clock signal must be read for receiving 1-bit data.

As described above, the conventional clock-synchronized communication has the clock signal changing twice in transmitting and receiving 1-bit data. Where these changes are processed by software, using general-purpose I/O ports provided for one-chip microcomputers or the like, an operation for reading the two changes of the clock signal consumes a longer processing time than the case of reading only one change of the clock signal. Consequently, an acceptable transmission speed is restricted by a maximum rate at which the receiving end can read the clock signal.

Where transmission and reception of the clock signal are carried out with CMOS devices, power consumption by the CMOS devices increases with an increase in the frequency of the clock signal. Further, since the data signal is synchronized with the clock signal, a data communication once started must be continued until a series of data to be communicated has been transmitted and received.

In the method of serial communication disclosed in JP-A 8-163182(1996), 1-bit data is received by reading only one change of the data signal for either one of the logical values. However, it is necessary to read two changes of the data signal for the other logical value as in the conventional clock-synchronized communication.

SUMMARY OF THE INVENTION

The object of the present invention is to provide a serial data communicating method and apparatus for facilitating high-speed communication.

The invention provides a serial data communicating method for communicating digital data as serial data in time series representing logical values of bits comprising:

providing a transmission path of data signals, and a transmission path of delimiting signals for indicating breaks between bits of serial data;

continuously transmitting, at a transmitting end, a data signal at levels corresponding to the logical values of bits of digital data to be communicated, and predetermined delimiting signals when consecutive bits in the data signal are of equal level; and receiving, at a receiving end, the data signal and the delimiting signals, and determining a logical value of each bit in the data signal and reading the logical value as digital data by regarding, as breaks between the bits, points of time at which the level of the data signal changes or points of time at which the delimiting signals are transmitted.

According to the invention, the transmitting end and the receiving end have, separately installed therebetween, a transmission path of serial data signals, and a transmission path of delimiting signals for indicating breaks between bits of serial data. The transmitting end continuously transmits a data signal at levels corresponding to the logical values of bits of digital data to be communicated, and predetermined delimiting signals when consecutive bits in the data signal are of equal level. It is therefore unnecessary to change the data signal in a synchronized manner as when a clock signal is used. The receiving end receives the data signal and the delimiting signals, and determines a logical value of each bit in the data signal and reads the logical value as digital data by regarding, as breaks between the bits, points of time at which the level of the data signal changes or points of time at which the delimiting signals are transmitted. Thus, it is unnecessary to constantly detect level changes, as of a clock signal, which occur at shorter intervals than with the data signal. The breaks between the bits may be determined based on the cycles of the data signal, to read the signal bit by bit in a simplified process, thereby achieving high-speed communication.

In the invention, the predetermined delimiting signals may be transmitted as level variations.

According to the invention, since the delimiting signals are transmitted as level variations, the receiving end may regard, as breaks between the bits, the points of time at which level changes occur with the data signal or the delimiting signals.

In the invention, the delimiting signals may be generated from the data signal by a programmed operation of a computer at the transmitting end, and the logical value of each bit in the data signal may be determined from the data signal and the delimiting signals to be read as digital data by a programmed operation of a computer at the receiving end.

According to the invention, a general-purpose I/O port, for example, may be used at the transmitting end, where the delimiting signals are generated from the data signal by a programmed operation of a computer. At the receiving end, the logical value of each bit in the data signal is determined from the data signal and the delimiting signals to be read as digital data by a programmed operation of a computer. Consequently, only relatively simple circuits are required, thereby achieving a compact system.

The present invention provides a serial data communicating apparatus for communicating digital data as serial data in time series representing logical values of bits, comprising:

data signal transmitting means for transmitting a data signal as serial data at levels corresponding to logical values of respective bits;

delimiting signal transmitting means for transmitting a delimiting signal as serial data for indicating breaks between bits in the data signal;

delimiting signal generating means for generating the delimiting signal with varied output levels to be transmitted by the delimiting signal transmitting means when consecutive bits in the data signal are of equal level; and signal receiving means for receiving the data signal and the delimiting signal transmitted from the data signal transmitting means and the delimiting signal transmitting means, respectively, and determining a logical value of each bit in the data signal and reading the logical value as digital data by regarding, as breaks between the bits, points of time at which the level of the data signal or the delimiting signal changes.

According to the invention, the data signal transmitting means transmits the data signal as serial data at levels corresponding to the logical values of bits. When consecutive bits in the data signal have the same value, the delimiting signal generating means generates the delimiting signal with varied output levels, indicating breaks between the bits in the data signal, to be transmitted as serial data by the delimiting signal transmitting means. The signal receiving means receives the data signal and the delimiting signal transmitted from the data signal transmitting means and the delimiting signal transmitting means, respectively, and determines a logical value of each bit in the data signal and reads the logical value as digital data by regarding, as breaks between the bits, points of time at which the level of the data signal or the delimiting signal changes. All this results in extended cycles of level changes. Where, for example, CMOS devices are used for changing the signal level or detecting signal level changes, power consumption may be reduced.

In the invention, the data signal transmitting means may include data latch means for deriving the data signal at levels corresponding to the logical values of the bits in the data signal, and the delimiting signal transmitting means may include delimiting latch means for deriving the delimiting signal at levels corresponding to the logical values of the bits in the delimiting signal.

According to the invention, the data signal transmitting means includes data latch means for deriving the data signal at levels corresponding to the logical values of the bits in the data signal, and the delimiting signal transmitting means includes delimiting latch means for deriving the delimiting signal at levels corresponding to the logical values of the bits in the delimiting signal. Where, for instance, the communicating process is achieved with software, the software may be engaged in communication only when the signal level is changed. Thus, a communication may be carried out while other processes are executed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1A:
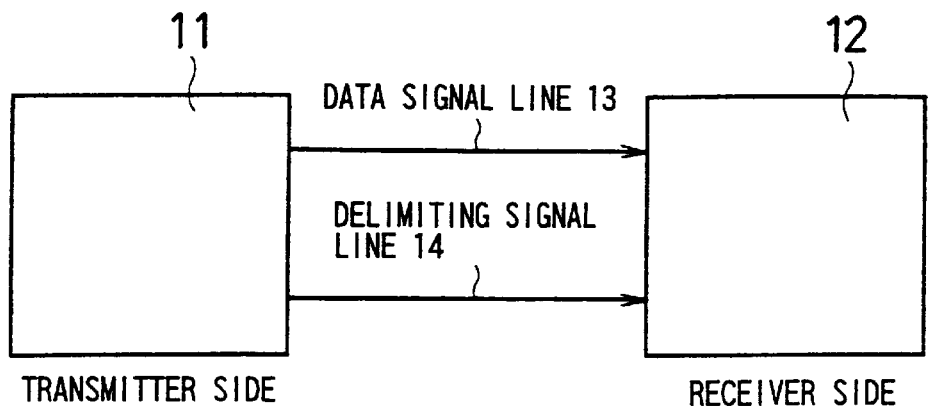
FIGS. 1A and 1B are a block diagram and a signal waveform diagram schematically showing one embodiment of the present invention.

Now referring to the drawings, preferred embodiments of the invention are described below.

Figure 1B:
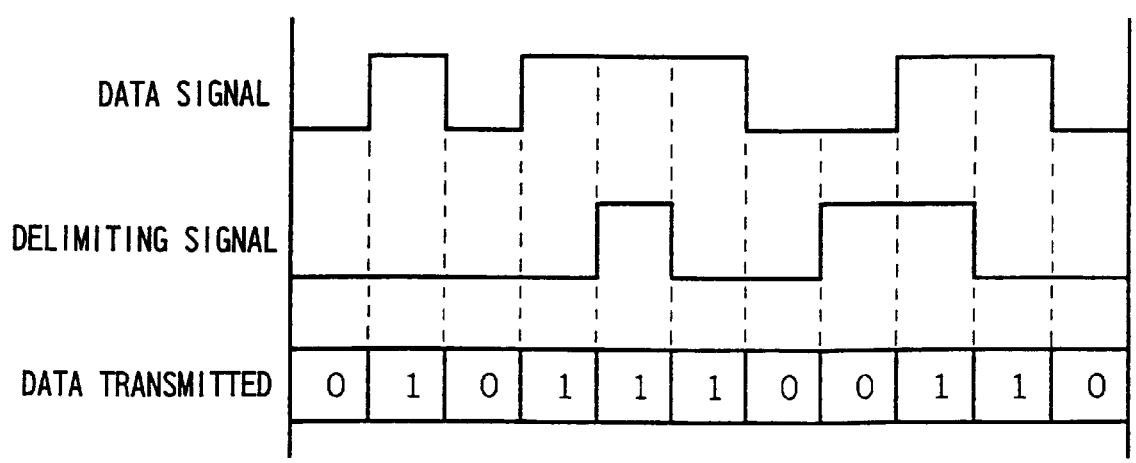

FIGS. 1A and 1B are a block diagram of a basic form of system for executing a method of communicating digital data as serial data according to the invention, and a diagram showing examples of transmit-receive data, data signal and delimiting signal. As shown in FIG. 1A, a transmitting device 11 and a receiving device 12 are interconnected through two transmission paths, i.e. a data signal line 13 for transmitting serial data, and a delimiting signal line 14 for transmitting a delimiting signal. The delimiting signal causes the receiving device 12 to recognize breaks between bits when consecutive bits of the transmit serial data have the same value.

FIG. 1B shows examples of serial data communicated by the method of serial data communication according to the invention, and signal waveforms of the data signal and delimiting signal corresponding to the data. The data signal is transmitted continuously through the data signal line 13, in single current NRZ (Non Return to Zero) sign format, and at levels corresponding to the logical values of data bits. A reference level is maintained during no-signal periods. The delimiting signal shown in FIG. 1B is transmitted with level variations when the consecutive bits in the data signal have the same value. As the logical values of the transmit data, for example, "1" is applied to the high level of the data signal, and "0" to the low level. As shown in FIG. 1B, the level of the delimiting signal remains unchanged in the event of a change in the logical value of consecutive bits of the transmit data. The level of the delimiting signal is changed when consecutive bits of the transmit data have the same value.

The above process is repeated until all data have been transmitted. In this way, the transmitting end can transmit 1-bit data by changing the level of either one of the data signal and delimiting signal only once. The receiving end, receiving the data signal and delimiting signal, reads as digital data the logical value of each bit in the data signal by regarding, as a break between bits, a point of time of a level change in either one of the data signal and delimiting signal.

Conventional clock-synchronized communication requires two level changes in the clock signal to communicate 1-bit data. In the method according to the present invention, only one change in the level of the data signal or delimiting signal is adequate for 1-bit data. Thus, compared with conventional clock-synchronized communication, the invention can process transmission and reception of bit data in a reduced time, to realize high-speed data communication. In this embodiment, the data signal and delimiting signal are processed and communicated by software, using general-purpose I/O ports.

Figure 2:
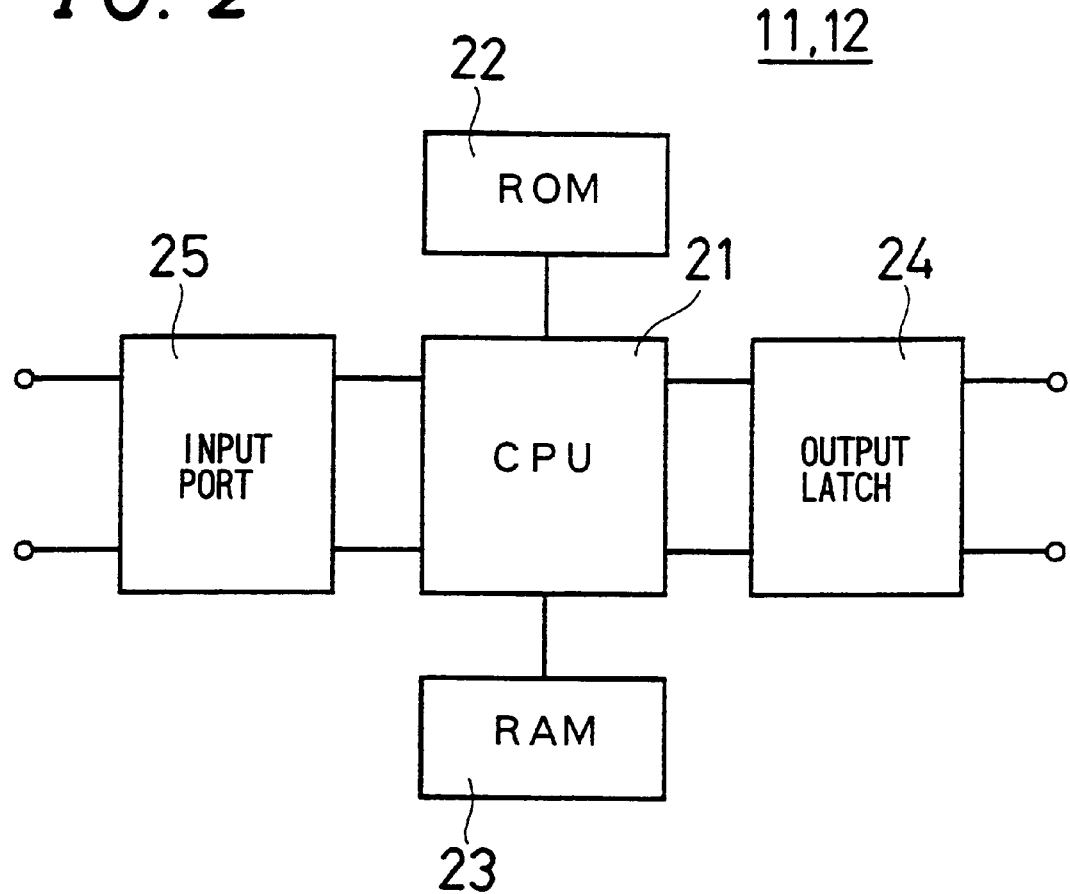
FIG. 2 is a block diagram schematically showing a construction of a transmitting device 11 or a receiving device 12 in the embodiment shown in FIG. 1.

FIG. 2 is a block diagram schematically showing an interior construction of the transmitting device 11 or receiving device 12 shown in FIG. 1A. The transmitting device 11 or receiving device 12 includes a ROM 22, a RAM 23, a latching output port 24 and an input port 25 controlled by a CPU 21, respectively. The data signal line 13 and delimiting signal line 14 in FIG. 1A extend between the latching output port 24 acting as the transmitting device 11 and the input port 25 acting as the receiving device 12. The latching output port 24 derives the signals at levels corresponding to the logical values of respective bits in the data signal and delimiting signal. The same signal level is maintained as long as CPU 21 maintains the same logical value. That is, CPU 21 needs to access the output latch 24 only when the signal levels are changed, thereby simplifying the transmitting process.

Figure 3:
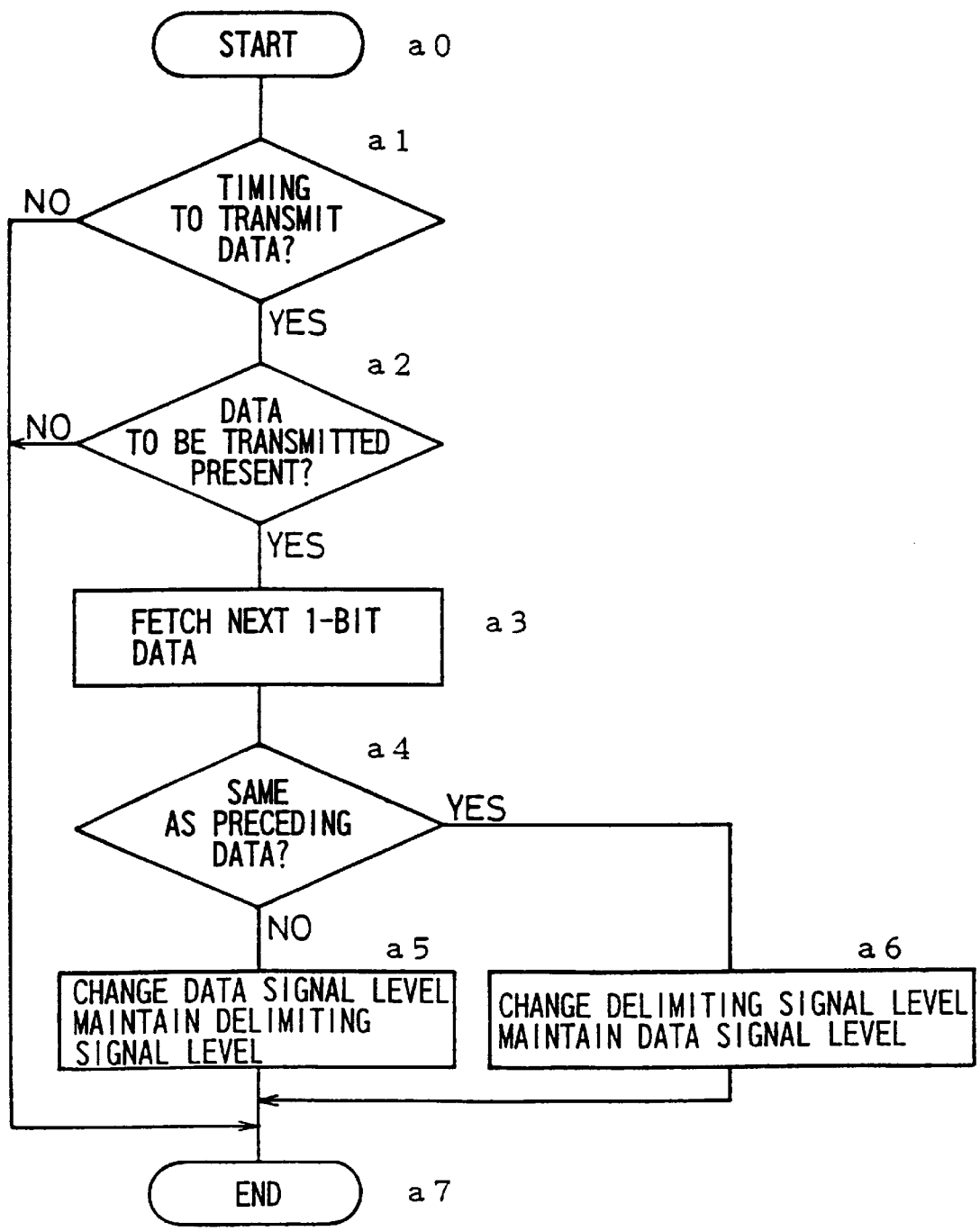
FIG. 3 is a flow chart of a transmitting operation in the embodiment shown in FIG. 1.

FIG. 3 is a flow chart illustrating a signal transmitting operation of the transmitting device 11 in this embodiment.

The operation starts at step a0. At step a1, CPU 21 acting as the transmitting device 11 determines whether it is time to transmit data. If it is time to transmit data, the operation proceeds to step a2. Otherwise, no data transmission takes place. At step a2, CPU 21 acting as the transmitting device 11 determines whether data to be transmitted is present in the memory space of RAM 23. If data to be transmitted is found, the operation proceeds to step a3. Otherwise, no data transmission takes place.

When the data to be transmitted is continuous from the data already transmitted, a next 1-bit data is fetched at step a3. If a new data group is to be transmitted, the first 1-bit data is fetched therefrom. At step a4, a comparison is made to determine whether the data fetched at step 3a has the same data signal level as the preceding transmit data. The operation proceeds to step a5 when the levels are determined to be different as a result of the comparison, and to step a6 when the levels are found the same. However, when the first data is fetched from a new data group at step a3, the data signal level of the data fetched at step a3 is compared with the reference level occurring during no-signal periods, and the operation proceeds to step a5. The latching output port 24 acting as the transmitting device 11 holds the levels of the data signal and delimiting preceding transmit signal. At step a5, the level of the data signal is changed while the level of the delimiting signal is maintained as it is. The data transmitting operation ends at step a7. At step a6, the level of the delimiting signal is changed while the level of the data signal is maintained as it is, and the data transmitting operation ends at step a7.

Figure 4:
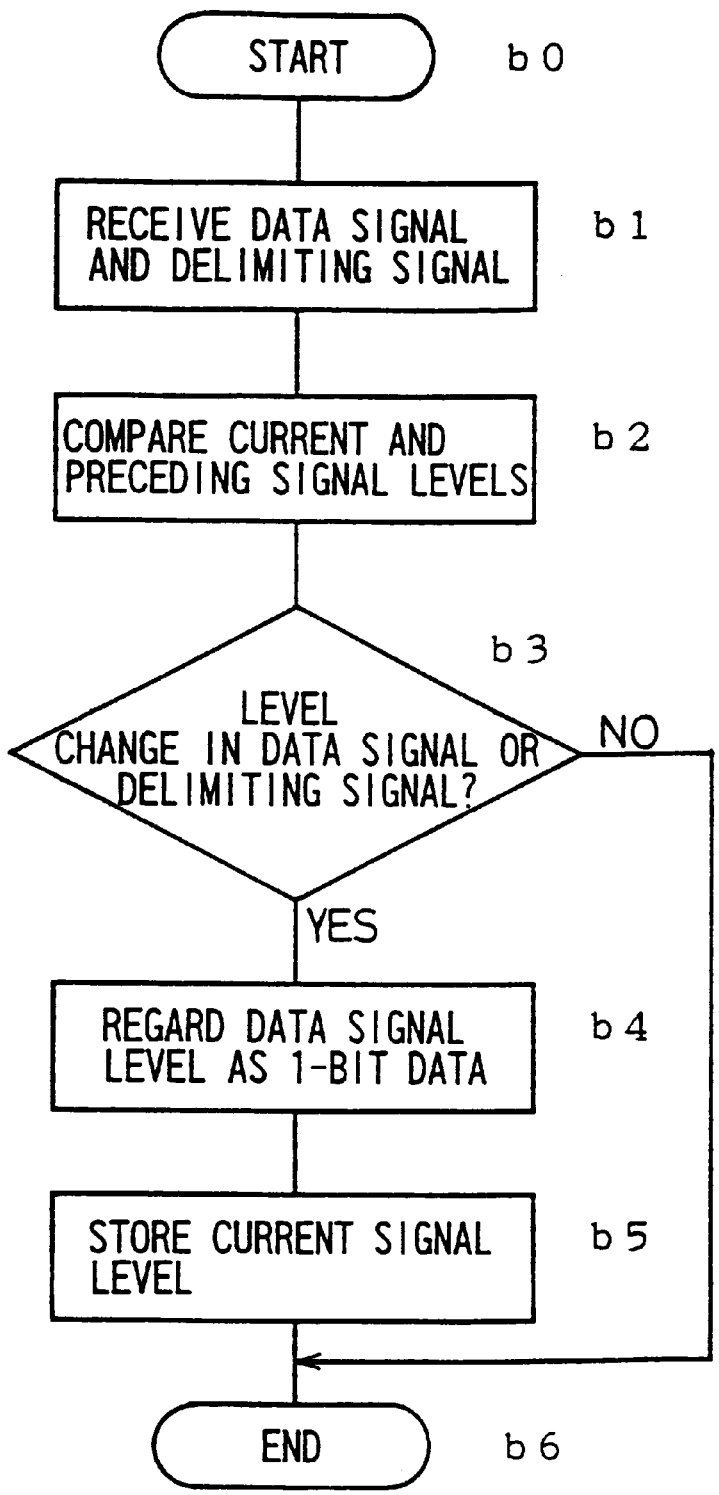
FIG. 4 is a flow chart of a receiving operation in the embodiment shown in FIG. 1.
Figure 5A:
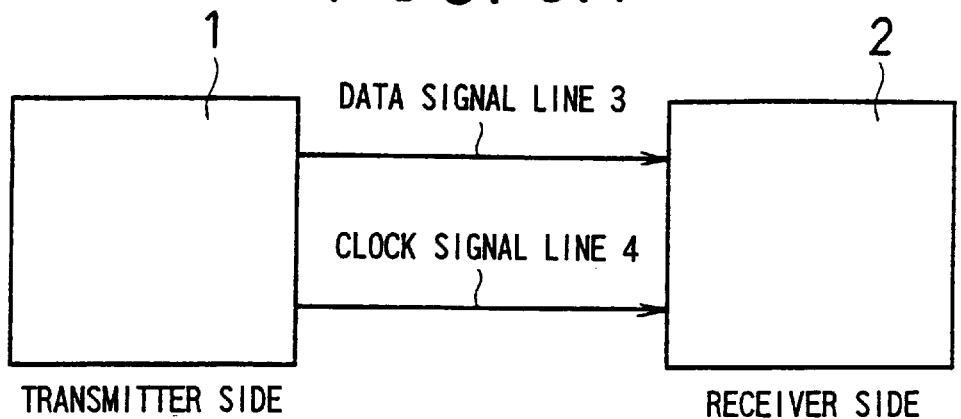
FIGS. 5A and 5B are a block diagram and a signal waveform diagram schematically showing a conventional clock-synchronized communication.
Figure 5B:
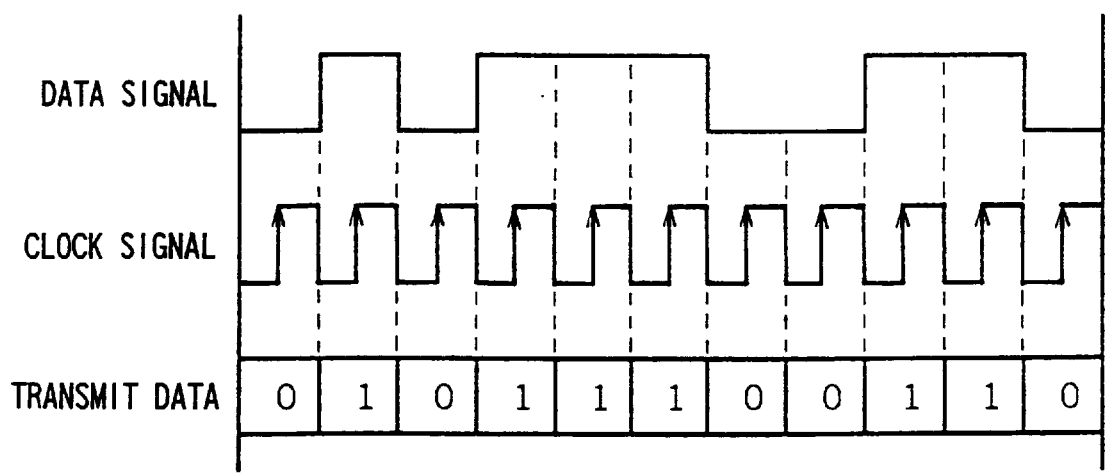
Figure 6:
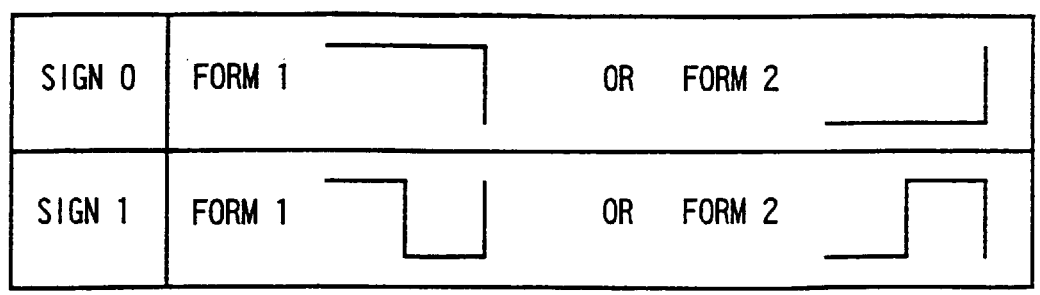
FIG. 6 is a diagram of signal forms shown in FIG. 1 of JP-A 8-163182(1996).

FIG. 4 is a flow chart illustrating a signal receiving operation of the receiving device 12 in this embodiment. The operation starts at step b0. At step b1, the receiving device 12 receives the data signal transmitted through the data signal line 13, and the delimiting signal transmitted through the delimiting signal line 14. At step b2, the levels of the current signals received at step b1 are compared with the levels of the preceding signals stored in RAM 23 acting as the receiving device 12. Step b3 is executed to determine whether, as a result of step b2, a change has been found in the level of the data signal or delimiting signal. The operation proceeds to step b4 in the event of a level change. Otherwise, the data receiving process is terminated.

At step b4, the level of the data signal received at step b1 is regarded as 1-bit data, and a logical value is determined from the level of the data signal to read the value as 1-bit digital data. At step b5, the levels of the current data signal and delimiting signal are stored in RAM 24 of the receiving device 12. The data receiving operation ends at step b6.

In the foregoing description, the roles of the transmitter and receiver are fixed. However, a full duplex communication may also be achieved by installing, besides the data signal line 13 and delimiting signal line 14, a further pair of data signal line and delimiting signal line connected to the input port 25 of the transmitting device 11 and the latching output port 24 of the receiving device 12.

While, in the foregoing description, electric cables are employed as the transmission paths of the data signal and delimiting signal, the transmission paths may be in the form of optical fiber, radio or infrared transmission paths.

In the foregoing description, the delimiting signal is transmitted as level variations. Alternatively, one-shot pulses or the like may be applied by way of the delimiting signal when consecutive bits in the data signal have the same value.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A serial data communicating method for communicating digital data as serial data in time series representing logical values of respective bits comprising:

provating a transmission path of data signals, and a transmission path of delimiting signals for indicating breaks between bits of serial data;

continuously transmitting, at a transmitting end, a data signal at levels corresponding to the logical values of bits of digital data to be communicated, and predetermined delimiting signals when consecutive bits in the data signal are of equal level; and receiving, at a receiving end, the data signal and the delimiting signals, and determining a logical value of each bit in the data signal and reading the logical value as digital data by regarding, as breaks between the bits, points of time at which the level of the data signal changes or points of time at which the delimiting signals are transmitted.

2. The serial data communicating method of claim 1, wherein the predetermined delimiting signals are transmitted as level variations.

3. The serial data communicating method of claim 1, wherein the delimiting signals are generated from the data signal by a programmed operation of a computer at the transmitting end, and the logical value of each bit in the data signal is determined from the data signal and the delimiting signals to be read as digital data by a programmed operation of a computer at the receiving end.

4. A serial data communicating apparatus for communicating digital data as serial data in time series representing logical values of bits, comprising:

data signal transmitting means for transmitting a data signal as serial data at levels corresponding to logical values of respective bits;

delimiting signal transmitting means for transmitting delimiting signals as serial data for indicating breaks between bits in the data signal;

delimiting signal generating means for generating the delimiting signals with varied output levels to be transmitted by the delimiting signal transmitting means when consecutive bits in the data signal are of equal level; and signal receiving means for receiving the data signal and the delimiting signals transmitted from the data signal transmitting means and the delimiting signal transmitting means, respectively, and determining a logical value of each bit in the data signal and reading the logical value as digital data by regarding, as breaks between the bits, points of time at which the level of the data signal or the delimiting signal changes.

5. The serial data communicating apparatus of claim 4, wherein the data signal transmitting means is provided with data latch means for deriving the data signal at levels corresponding to the logical values of the bits in the data signal, and the delimiting signal transmitting means is provided with delimiting latch means for deriving the delimiting signal at levels corresponding to the logical values of the bits in the delimiting signal.

* * * * *